United States Patent [19]
Ballard

[11] Patent Number: 4,629,203
[45] Date of Patent: Dec. 16, 1986

[54] YARD CADDY

[76] Inventor: Thomas Ballard, 25550 Mulberry, Southfield, Mich. 48034

[21] Appl. No.: 642,779

[22] Filed: Aug. 21, 1984

[51] Int. Cl.$^4$ .............................................. B62B 1/20
[52] U.S. Cl. .................... 280/47.26; 37/265; 298/2
[58] Field of Search .............. 280/47.24, 47.26, 47.23, 280/47.17, 47.19; 37/265, 285, 241; 248/98, 99; 298/2

[56] References Cited

U.S. PATENT DOCUMENTS

| D. 149,437 | 4/1948 | Nelson | 280/47.26 |
|---|---|---|---|
| 176,528 | 4/1875 | Angstead | 248/99 |
| 191,502 | 5/1877 | Wing | 280/47.19 |
| 362,807 | 5/1887 | Wing | 248/98 |
| 609,129 | 8/1898 | Twist | 280/47.24 |
| 2,759,322 | 8/1956 | Herzog | 56/DIG. 5 |
| 2,792,970 | 5/1957 | Gaiman | 56/DIG. 5 |
| 2,891,332 | 6/1959 | Kacian | 280/47.26 |
| 2,932,103 | 4/1960 | Wright | 280/47.26 |
| 3,102,375 | 9/1963 | Troka et al. | 56/16.8 |
| 3,774,930 | 11/1973 | Pravednekow | 280/47.24 |
| 3,992,034 | 11/1976 | Smith, Sr. et al. | 248/98 |

FOREIGN PATENT DOCUMENTS

| 1358085 | 3/1964 | France | 280/47.26 |
|---|---|---|---|
| 50620 | 2/1920 | Sweden | 280/47.26 |

Primary Examiner—John J. Love
Assistant Examiner—Eric D. Culbreth
Attorney, Agent, or Firm—Krass & Young

[57] ABSTRACT

A utility cart especially suited for snow removal and other yard work and comprising a generally rectangular body having side panels, a rear panel, and a bottom panel. A pair of wheels are provided at the rear of the body for rollably engaging a support surface and a rounded nose is provided at the front of the body. The rounded nose normally slidably engages the support surface but is rollably engagable with the support surface in response to a generally upward force applied to handle at the rear of the body to facilitate upward rolling pivotal movement of the cart about its nose to dump the contents of the cart out of the open front end of the body. The cart is particularly suited for snow removal but, because of the basic open box configuration of the body, has general application for year round yard work.

3 Claims, 10 Drawing Figures

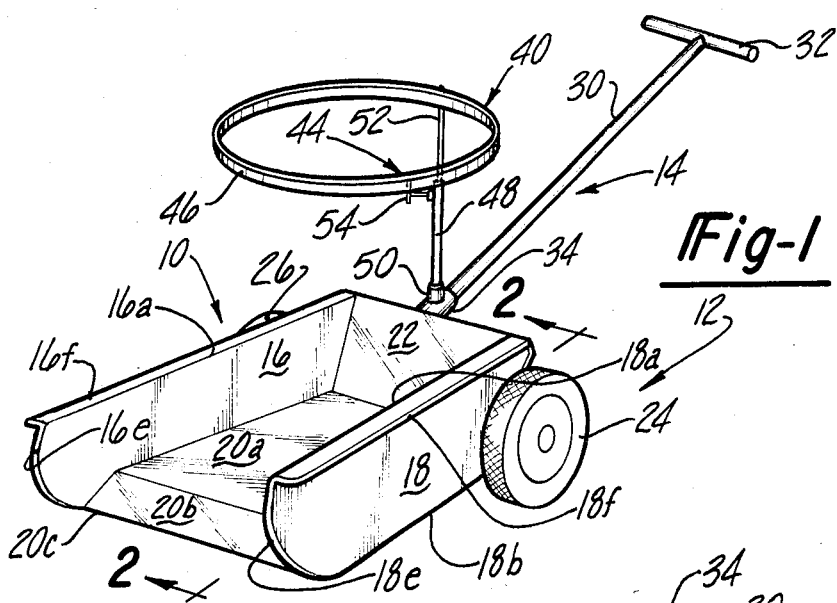
*Fig-1*
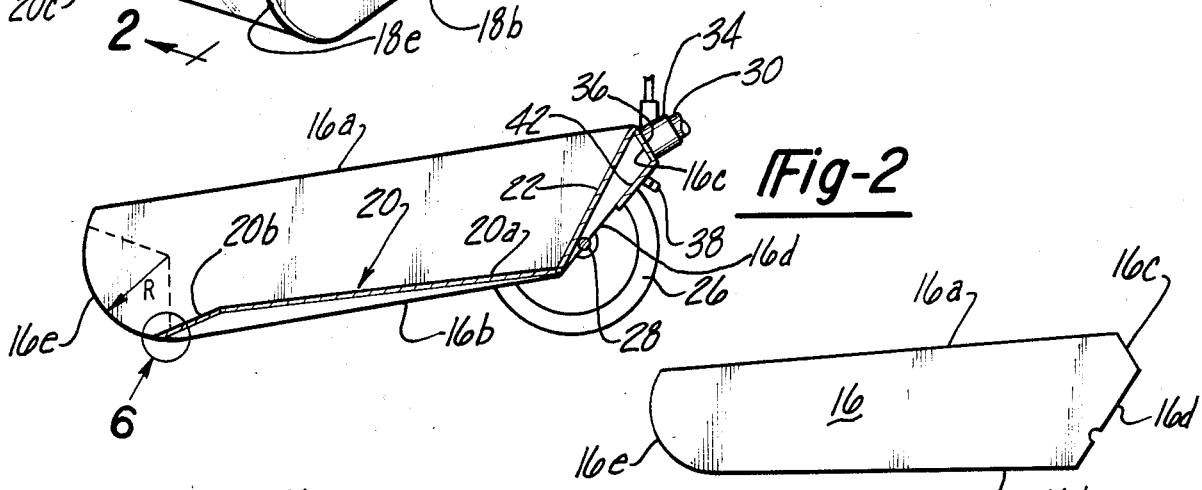
*Fig-2*
*Fig-5*
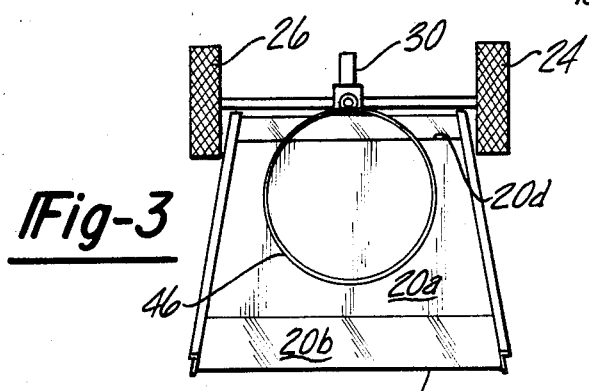
*Fig-3*
*Fig-6*
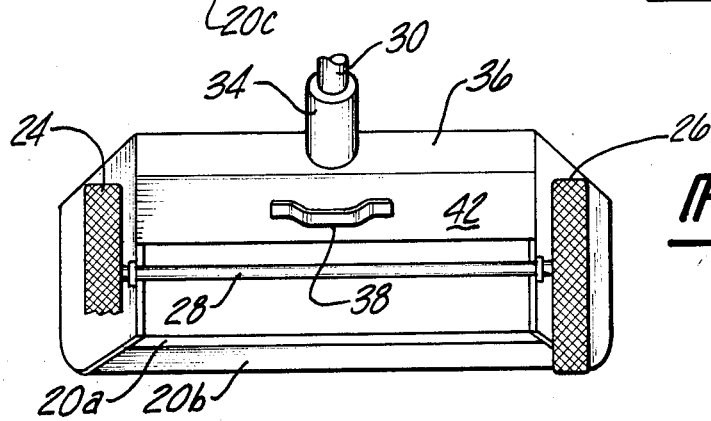
*Fig-4*

YARD CADDY

DESCRIPTION

TECHNICAL FIELD

This invention relates to utility carts and, more particularly, to utility carts that are particularly suited for general yard work on a year round basis.

BACKGROUND ART

A myriad of carts have been proposed over the years to facilitate various yard chores. However, these carts have either been essentially dedicated to particular seasonable chores or, if suitable for year round use, have been unduly complicated and/or expensive.

SUMMARY OF THE INVENTION

This invention provides a yard cart that is simple and inexpensive and that is suitable for year round use. More specifically, this invention provides a yard cart that is especially suitable for snow removal but that, by virtue of its fundamental structural configuration, is also useful in performing spring, summer and fall yard chores.

According to an important feature of the invention the utility cart comprises a generally rectangular body having bottom, side and rear panels and an open top and front; wheel means are provided adjacent the rear end of the body for rollably engaging a support surface; a rearwardly extending handle is provided at the rear end of the body; and a rounded nose is provided at the front end of the body which normally slidably engages the support surface but which is rollably engagable with the support surface in response to a generally upward force applied to the handle to facilitate upward rolling pivotal movement of the cart about its nose. This arrangement allows the cart to be pushed forwardly on the support surface to scoop loose, massed material disposed on the support surface into the body through its open front end whereafter the material thus scooped into the cart may be dumped from the cart by a generally upward force exerted on the handle to rollably pivot the cart upwardly about its rounded nose to a generally vertical, dumping position.

According to a further feature of the invention, the front end of each of the side panels of the body is rounded to constitute the rounded nose at the front end of the body.

According to a further feature of the invention, with the wheel means rollably engaging the support surface and the rounded front ends of the side panels slidably engaging the support surface, the bottom panels angles downwardly and forwardly and its front edge and extends horizontally between the rounded front ends of the side panels at a level closely adjacent to but clearing the support surface. This construction renders the utility cart particularly suitable for snow removal, since the snow, in response to forward movement of the cart, moves readily into the body structure from where, once the body has been loaded, it may be readily dumped by pivoting the cart upwardly about its rounded nose.

According to yet another feature of the invention, the wheel means comprise a wheel positioned outboard of each of the side panels at the rear end of the cart and the body of the cart flairs outwardly and forwardly so that the outboard ends of the front edge of the bottom panel are outboard of the wheels. With this arrangement, the front edge of the bottom panel clears a path for the wheels through snow or other loose massed material on the support surface.

According to a still further feature of the invention, the handle comprises an elongated rod member secured at its front end to the body adjacent the rear end of the body and a push member secured to the rear end of the rod member, and the cart further includes another handle member secured to the rear end of the body in close coupled relation to the body to facilitate lifting of the cart totally clear of the support surface and movement of the cart in a generally downwardly depending position between work and/or storage stations.

These and other features and advantages of the inventions will be apparent from the following description of a preferred embodiment of the invention.

BRIEF DESCRIPTION OF THE DRAWINGS

FIG. 1 is a perspective view of the invention utility cart;

FIG. 2 is a longitudinal cross sectional view taken on line 2—2 of FIG. 1;

FIG. 3 is a plan view of the invention utility cart;

FIG. 4 is a rear view of the invention utility cart;

FIG. 5 is an elevational view of a side panel of the body of the cart;

FIG. 6 is a detail view of the cart structure within the circle 6 of FIG. 2;

DETAILED DESCRIPTION OF THE PREFERRED EMBODIMENT

Figure 7:
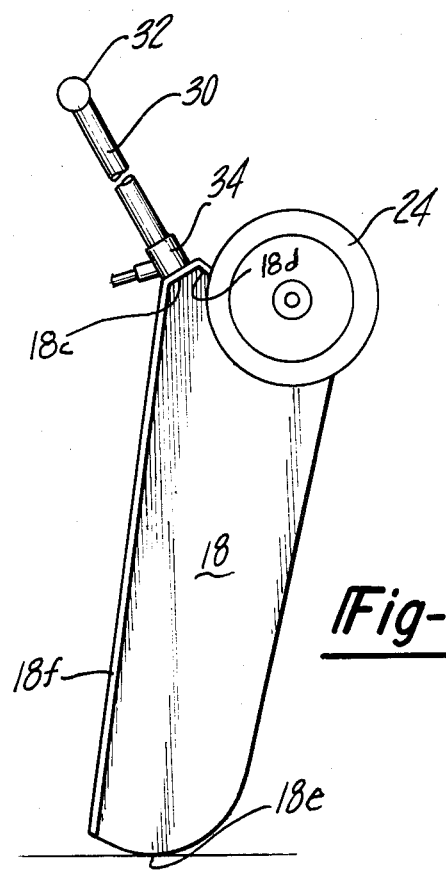
FIG. 7 shows the manner in which the cart may be pivoted upwardly on its rounded front nose to facilitate dumping of the cart contents.
Figure 9:
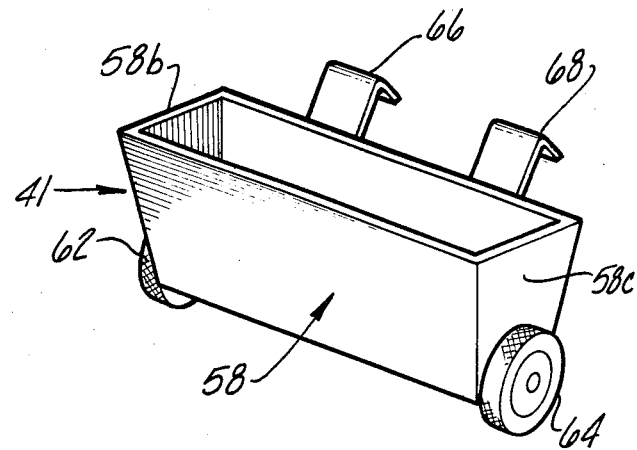
FIGS. 9 and 10 illustrate details of a spreader attachment for use with the cart.
Figure 10:
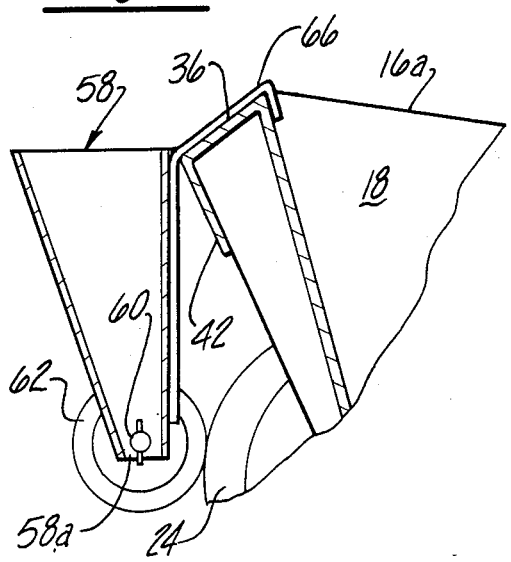
Figure 8:
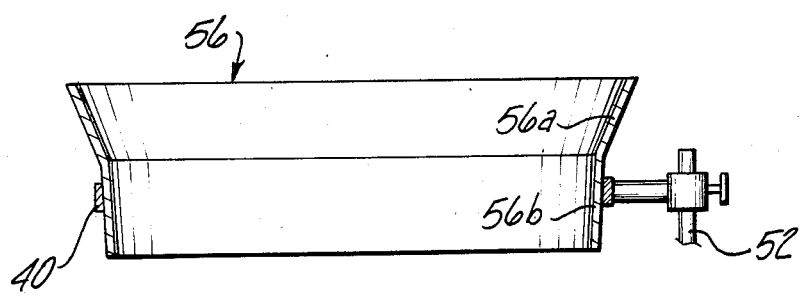
FIG. 8 illustrates details of a bagging attachment for use with the cart.

The invention utility cart, broadly considered, comprises a body 10, wheel means 12, and a handle structure 14.

Body 10 is preferably fabricated from a plurality of welded together metal panels although, as will be obvious, it may be formed or fabricated in many different manners. Body 10 includes left and right side panels 16 and 18, a bottom panel 20 and a rear panel 22. Body 10 is thus open at the top and front.

Side panels 16 and 18 include top edges 16a, 18a; bottom edges 16b, 18b; upper rear edges 16c, 18c; lower rear edges 16d, 18d; and front edges 16e, 18e. The top edges of panels 16 and 18 are bent outwardly to form reinforcing flanges 16f, 18f extending essentially from front to rear of the panels. The forward edges 16e, 18e are formed as circular arcs having a radius R centered at approximately the vertical midpoint of the panels. The arcs extend for at least 90° and preferably, as illustrated, for significantly more than 90°.

Bottom panel 20 is a compound structure comprising a rear portion 20a and a front portion 20b. Portions 20a and 20b may comprise bent portions of the same plate member or may comprise separate panels welded together. Portion 20a comprises the main portion of the body panel and extends downwardly and forwardly at a relatively shallow angle. Portion 20b comprises a minor portion of the body panel and extends downwardly from the front edge of panel 20a at a relatively steep angle.

Rear panel 22 slopes upwardly and rearwardly and is rigidly secured between the rear ends of side panels 16 and 18.

As best seen in FIG. 3, body 10 flairs outwardly and forwardly so that the front edge 20c of front bottom panel portion 20b is significantly wider than the rear edge 20d of rear bottom panel portion 20a.

Wheel means 12 comprise wheels 24 and 26 journaled at the opposite ends of a rigid axle 28. Axle 28 is positioned in arcuate cut-outs in the lower rear edges 16d, 18d of side panels 16, 18 and is welded to the rear face of rear panel 22. Wheels 24 and 26 are thus positioned outboard of a respective side panel 16 and 18 and inboard of the outer edges of bottom panel front edge 20c.

Handle structure 14 includes a rod member 30 and a push member 32. Rod member 30 is rigidly received at its front end in a fitting 34 welded to a reinforcing plate 36 secured to and extending between side panel upper rear edges 16c and 18c. Push member 32 is transversely and rigidly secured to the rear end of rod member 30.

The invention utility cart also includes an auxiliary handle 38, a bagging attachment seen generally at 40, and a spreader attachment seen generally at 41.

Handle 38 is centrally secured to a panel 42 extending rigidly between side panel lower rear edges 16d at a location above axle 28.

Bagging attachment 40 includes a telescopic post assembly 44 and a hoop 46. Post assembly 44 includes a lower rigid tubular member 48 rigidly secured at its lower end to a fitting 50 formed integrally with fitting 34, and an upper post member 52 telescopically received in the upper end of lower post 48 and held in a position of vertical adjustment by set screw assembly 54. Hoop 46 comprises a rigid band of sheet metal material formed into a circular loop and rigidly secured at its rear end to the upper end of upper post member 52 so as to generally overlie body 10. Bagging attachment 40 may also include a loading funnel 56, of sheet metal or the like, adapted to be removably seated in hoop 46. Funnel 56 is conical and includes an upper portion 56a having a relatively larger downwardly inward taper and a lower portion 56b having a relatively small downwardly inward taper.

Spreader attachment 41 includes an elongated hopper 58, a rotary distributor member 60, wheels 62, 64 and attachment brackets 66, 68. Hopper 58 is open at its top and tapers downwardly and inwardly to a narrow elongated discharge opening 58a. Rotary distributor member 60 is of known form and is mounted for rotary movement in hopper 58 adjacent discharge opening 58a. Wheels 62, 64 are respectively drivingly secured to the opposite ends of distributor member 60 outboard of the respective end panels 58b, 58c of the hopper. Attachment brackets 66, 68 are secured to transversely spaced locations on the forward upward edge of hopper 58.

The invention utility cart is usable in a yard environment on a year round basis. For snow removal usage in winter months, the cart is pushed forwardly into the snow with the wheels 24 and 26 rollably engaging the ground surface and the rounded nose at the front end of the cart slidably engaging the ground surface. As best seen in FIG. 6, the front edge 20c of forward bottom panel 20b is positioned closely adjacent to the ground surface but clearing the ground surface so as to not impede the forward movement of the cart. The snow moves readily over the forward edge 20c in response to forward movement of the cart and is loaded into the interior of the cart. Since the outboard ends of front edge 20c are disposed outboard of wheels 24 and 26, the body of the cart clears a path for the wheels as the cart moves forwardly so that the wheels are rolling at all times over cleared surfaces. Once a sufficient load has been scooped into the body of the cart, forward movement of the cart is halted and an upward pressure is exerted on the handle push member 32 to pivot the cart upwardly to the dumping position seen in FIG. 7. The upward pivotal movement of the cart is facilitated by the smooth rolling of arcuate surfaces 16e, 18e on the ground surface so that the dumping operation is performed with a minimum of effort. Once the snow has been dumped from the cart, the cart is pivoted downwardly with circular edges 16e, 18e again facilitating a smooth rolling downward movement to the working position of FIG. 2.

Whereas the cart, as seen, is especially suited for snow removal, it also has year round application for general yard work. For example, because of the basic open box configuration of body 10, the cart is ideally suited for a myriad of hauling applications. Items to be hauled may be loaded over the side panels of the cart and downwardly into the interior of the cart or, in the case of heavy or awkward objects, may be readily loaded into the interior of the cart through the open front end with the forward bottom panel 20b serving as a pilot portion to cammingly assist movement of the load into the interior of the body. As a further example, and with the bagging attachment 40 installed, the invention utility cart is ideally suited for bagging leaves or other lawn debris in fall and spring seasons. Specifically, a bag may be positioned within hoop 46 with its upper edge turned outwardly and downwardly over the hoop and the lower end of the bag supported on the bottom panel 20. Thus positioned, the bag is readily loaded and, once loaded, is readily transported by the invention utility cart to a storage or removal facility. Loading of the bag may be greatly facilitated by the use of funnel 56. Specifically, after the upper edge of a bag has been positioned over hoop 40, funnel 56 may be seated in hoop 40 to hold the bag firmly in place and facilitate loading into the bag. As a further example of the year round utility of the invention cart, spreader attachment 41 may be removably mounted on the rear of the cart by hooking brackets 66, 68 over reinforcing plate 36 and rear panel 22 with spreader wheels 62, 64 drivingly engaging cart wheels 24, 26. Forward movement of the upper cart will now drive the spreader wheels to rotate distributor member 60 and controllably discharge fertilizer or other material in hopper 58 downwardly through opening 58a and onto the underlying ground surface. In general, the invention utility cart is usable on a year round basis in any situation where it is desired to move anything around the yard and is particularly suitable to chores involving very heavy objects which may be conveniently loaded through the open front end of the cart. The invention cart is also ideally suited for chores in which it is desired to not only haul objects or materials to a particular location, but also to dump the objects or material once the material has been moved to the desired yard location.

Whereas a preferred embodiment of the invention has been illustrated and described in detail it will be apparent that various changes may be made in the preferred embodiment without departing from the scope or spirit of the invention.

I claim:
1. A utility cart comprising:
A. a generally rectangular body having bottom, side and rear panels and an open top and front;
B. wheel means adjacent the rear end of said body rollably engaging a support surface;
C. a rearwardly extending handle at the rear end of said body;
D. a rounded nose at the front end of said body normally slidably engaging the support surface but rollably engagable with the support surface in response to generally upward force applied to said handle to facilitate upward rolling pivotal movement of said cart about said nose;
E. the front end of each of said side panels being rounded to constitute said nose;
F. with said wheel means rollably engaging the support surface and the rounded front ends of said side panels slidably engaging the support surface, said bottom panel angling downwardly and forwardly and its front edge extending horizontally between the rounded front ends of said side panels at a level closely adjacent to but clearing the support surface, whereby when said cart is moved forwardly by a generally forward pushing force exerted on said handle, loose massed material such as snow disposed on the support surface will move upwardly over said bottom panel horizontal front edge and rearwardly into said cart, whereafter the material thus loaded into the cart may be dumped from the cart by a generally upward force exerted on said handle to rollably pivot said cart upwardly about is rounded nose to a generally vertical, dumping position.

2. A utility cart according to claim 1 wherein:
G. said wheel means comprise a wheel positioned outboard of each of said side panels at the rear end of said body; and
H. said body flairs outwardly and forwardly so that the outboard ends of said bottom panel front edge are outboard of said wheels, whereby said front edge clears a path for said wheels in response to forward movement of said cart.

3. A utility cart according to claim 1 wherein:
G. said bottom panel is a compound structure comprising;
(1) a main portion extending from the rear of said body to the vicinity of the front end of said body at a relatively shallow downward angle and
(2) a front portion extending from the front edge of said main portion to the front edge of said bottom panel at a relatively steep downward angle.

* * * * *